Sept. 11, 1928. 1,684,265
H. J. CRINER
CONTROLLING MECHANISM FOR WRINGERS AND OTHER MACHINERY
Filed March 5, 1925
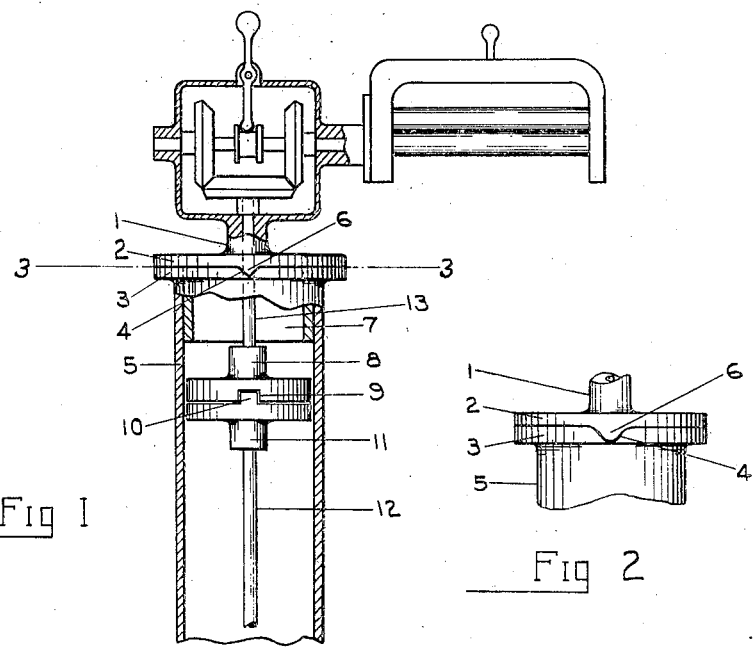
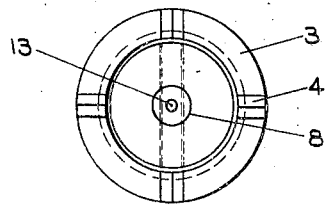
Harry J. Criner
INVENTOR
BY Curtis Bush
ATTORNEY Patented Sept. 11, 1928.

1,684,265

UNITED STATES PATENT OFFICE.

HARRY J. CRINER, OF CLARINDA, IOWA, ASSIGNOR OF ONE-HALF TO A. G. BUSH, OF DAVENPORT, IOWA.

CONTROLLING MECHANISM FOR WRINGERS AND OTHER MACHINERY.

Application filed March 5, 1925. Serial No. 13,402.

My invention relates to improvements in controlling mechanism for wringers and other machinery.

The objects of my invention are:

1. To provide means by which the clutch driving a wringer or similar machine will be thrown out of engagement automatically whenever a hand or other object is caught between the rolls of the wringer or other machine.

2. To provide means for automatically stopping a pair of rolls or other revolving parts when any object becomes caught between them.

I attain these objects by the mechanism illustrated in the accompanying drawings, in which,—

Figure 1 is an elevation of my device showing a part of the gear housing and a part of the supporting post or column cut away but with the wringer relatively greatly reduced in size; Fig. 2 is a detail showing a modified form of lug and seat and Figure 3 is a top or plan view of the flange at the top of the supporting post.

It is common practice in connection with combined wringers and washing machines to attach a supporting post or column, 5, to the washing machine, in which a drive shaft, 12, is mounted which has its lower end geared to or otherwise driven by a motor and which has its upper end fitted with one member of a clutch, 10, the hub of which, 11, is secured to the drive shaft, 12, by a drive fit or other suitable means. The clutch member, 10, is adapted to engage a corresponding clutch member, 9, secured by a hub, 8, on the lower end of a jack shaft, 13, the upper end of which carries a horizontal gear meshing with the wringer gears which are operated by a clutch in the usual well-known manner.

A gear housing, 1, is provided in which the gears are mounted.

In my device, I provide a downward extension, 7, which is machined so as to fit closely into the upper end of the post or column, 5, and to revolve freely therein. I form the column, 5, with a circular flange, 3, at its upper end which extends outwardly all around from the column, 5, to a sufficient distance to afford a fairly firm seat for the circular flange, 2, which is formed integral with the gear housing, 1, and corresponding in size and shape with the flange, 3.

The lower surface of the flange, 2, is provided with one or more lugs, 6, which extend downwardly and are normally seated in corresponding notches, 4, cut in the flange, 3.

The lugs, 6, may be formed with straight faces and an angular point as in Figure 1 or with the angles rounded and the faces somewhat curved as shown in Figure 2 or in any other form best suited to fit the requirements of any particular case.

The lugs, 6, are formed of a slightly greater length downwardly than the depth of the engaging members, 9 and 10, of the clutch.

When the wringer is in operating position, the lugs, 6, are seated in the notches or seats, 4, and the faces of the flanges, 2 and 3, are in juxtaposition, but when the wringer housing is turned either to the right or left, the collar, 2, turns with it forcing the lugs, 6, out of the notches, 4, and raising the entire gear housing, 1, together with the jack shaft, 13, and clutch member, 9, so as to disengage the clutch member, 9, from the clutch member, 10.

It often happens in the operation of a wringer that the clothing will become bunched and stop the rolls or cause breakage or at times the fingers of the operator will get caught between the rolls and the operator's hand drawn into the wringer. With my improved device, whenever a bunch of clothing or a hand gets caught in the rolls, it will increase the resistance of the rolls against turning to such an extent that the horizontal gear, instead of forcing the vertical wringer gear to revolve, will cause the whole gear housing to rotate upon the collar, 3, thus raising the collar, 2, by forcing the lugs, 6, to ride upon the face of the flange, 3, and disengaging the clutch member, 9, from the fixed clutch member, 10.

It is customary to have a release lever mounted upon the wringer, but an operator getting caught in the wringer will sometimes forget to throw the release lever or cannot reach it and will then be severely injured, or a bunch of clothes will be drawn between the rolls and if not promptly released, will be torn or damaged or if the rolls are locked, the cogs may be stripped from the wringer gears.

With my device, neither of these things can happen for as soon as the rolls are locked or their movement seriously impeded by a hand or a bunch of clothes or other object, the force required to turn the gears while the rolls are so locked, will be sufficient to cause the gear housing to rotate and the clutch will thus be thrown out of engagement as described.

I am aware that gear reversing clutches and release levers have been in common use and I make no separate claim for that part of the apparatus. I do, however, claim broadly all means by which the increased resistance of the rolls being turned by the gears arising from a hand or other object being caught between the rolls, is utilized to throw the roll driving mechanism out of engagement with a power driven shaft or to disconnect the roller driving means from the propelling means with which they are normally operated. I do not limit my claims to the precise form shown, but claim broadly any and all equivalent means by which a clutch or other driving connection is disengaged.

It is obvious that either member of the clutch may be secured in fixed position and that either one of them may be slidable upon its shaft without departing from the spirit of my invention or that other devices than the form of clutch shown may be used for that purpose.

It is also obvious that the lugs, 6, or similar means may be attached either to collars or to extensions of either the gear housing or the supporting column and many other equivalents may be substituted for different parts of my apparatus.

I therefore claim broadly all such means for automatically disengaging the driving power from the roll driving mechanism of a wringer or any other machine to which it may be applicable as come within the scope of my invention as herein described.

I claim:

1. An automatic wringer release comprising a gear housing mounted upon the upper end of a supporting column having a propeller shaft secured therein, a flange secured to the gear housing adapted to rest upon a corresponding flange united to the upper end of the supporting column, a jack shaft mounted within the gear housing and carrying a gear upon its upper end adapted to operate the wringer gears and carrying a clutch member upon its lower end adapted to engage a corresponding clutch member mounted upon the propeller shaft, and lugs united to the gear housing adapted to seat within corresponding notches formed in the flange of the supporting column.

2. An automatic wringer release comprising a driving mechanism, operating mechanism connected to the wringer rolls, a disengageable clutch coupling between the driving mechanism and the wringer roll operating mechanism, and means secured adjacent the roll operating mechanism adapted to automatically disengage the clutch coupling when the wringer rolls are accidentally stopped by becoming clogged with an excess thickness of material fed thereto.

3. An automatic wringer release comprising a supporting column and a propeller shaft mounted therein, a gear housing carrying a jack shaft mounted therein and revolubly mounted upon the top of the supporting column and having an extension rotatably secured within the upper end of the supporting column, a clutch connection between the propeller shaft and the jack shaft, and means secured to the gear housing and the column adapted to disengage such clutch connection when the gear housing is rotated slightly upon the supporting column.

In testimony whereof he affixes his signature.

HARRY J. CRINER.